(12) United States Patent
Palmquist

(10) Patent No.: US 7,453,418 B2
(45) Date of Patent: Nov. 18, 2008

(54) DISPLAY OF VISUAL DATA AS A FUNCTION OF POSITION OF DISPLAY DEVICE

(75) Inventor: Robert D. Palmquist, Faribault, MN (US)

(73) Assignee: Speechgear, Inc., Northfield, MN (US)

( * ) Notice: Subject to any disclaimer, the term of this patent is extended or adjusted under 35 U.S.C. 154(b) by 712 days.

(21) Appl. No.: 11/012,861

(22) Filed: Dec. 15, 2004

(65) Prior Publication Data
US 2005/0168399 A1 Aug. 4, 2005

Related U.S. Application Data

(60) Provisional application No. 60/531,284, filed on Dec. 19, 2003.

(51) Int. Cl.
*G09G 5/00* (2006.01)
(52) U.S. Cl. .................... 345/1.1; 345/1.2; 345/156; 345/173
(58) Field of Classification Search ........... 345/1.1–1.3, 345/2.1–2.3, 5–6, 9, 22, 24, 901–903, 156–159, 345/166, 169–173, 177
See application file for complete search history.

(56) References Cited

U.S. PATENT DOCUMENTS

| | | | |
|---|---|---|---|
| 5,751,269 A | 5/1998 | Black et al. | |
| 6,690,337 B1 * | 2/2004 | Mayer et al. | 345/1.1 |
| 6,738,028 B2 * | 5/2004 | Asahi et al. | 345/1.1 |
| 7,196,677 B2 * | 3/2007 | Sato et al. | 345/1.3 |
| 2002/0075199 A1 | 6/2002 | Asahi et al. | |
| 2003/0151562 A1 * | 8/2003 | Kulas | 345/1.1 |
| 2004/0263424 A1 * | 12/2004 | Okuley | 345/1.1 |
| 2007/0063922 A1 * | 3/2007 | Kim et al. | 345/1.1 |

OTHER PUBLICATIONS

Copy of Notification of Transmittal of the International Search Report and The Written Opinion for corresponding patent application No. PCT/US04/42046, mailed Feb. 24, 2006, (8 pages).
International Preliminary Report on Patentability from corresponding PCT Serial No. PCT/US04/42046 mailed Nov. 1, 2006 (6 pages).
First Office Action from corresponding Chinese Application Serial No. 200480037145.3 mailed Jan. 11, 2008 (6 pages).

* cited by examiner

*Primary Examiner*—Richard Hjerpe
*Assistant Examiner*—Mansour M Said
(74) *Attorney, Agent, or Firm*—Shumaker & Sieffert, P.A.

(57) ABSTRACT

In general, the invention is directed to techniques by which visual data is mapped to one or more display devices as a function of the positions of the display devices. The invention may support mapping of visual data to any number of display devices, which may cooperate to display the visual data as if the display devices were a single, large display device. In addition, the invention supports dynamic monitoring of the positions of display devices, with the visual data being mapped to a display device changing as the position of each display device changes.

12 Claims, 6 Drawing Sheets

DISPLAY OF VISUAL DATA AS A FUNCTION OF POSITION OF DISPLAY DEVICE

This application claims the benefit of U.S. Provisional Application Ser. No. 60/531,284, filed Dec. 19, 2003, the entire content of which is incorporated herein by reference.

TECHNICAL FIELD

The invention relates to display of visual data.

BACKGROUND

Many devices include displays that can present visual data, such as pictures, graphs and animation. Some of the devices, such as tablet computers, laptop computers and personal digital assistants (PDAs), may have comparatively small displays, and may not be able to present the visual data without significant loss of detail. Further, there are many situations in which it may be desirable to present visual data to a group, but the displays may be too small for an effective presentation.

SUMMARY

In general, the invention is directed to techniques by which visual data is mapped to a display device as a function of the position of the display device. The invention may support such mapping with any number of display devices, which may cooperate to behave as a large display device. In addition, the invention supports dynamic monitoring of the positions of display devices, with the visual data being mapped to a display device changing as its position changes.

A position processor determines the position of a particular display device with respect to a position reference. The relative position of the display device may be a function of its distance from the position reference, and its orientation with respect to the position reference. The invention is not limited to any technique for assessing the position of a display device, and includes, for example, determining the position of a display device optically, electromagnetically and tactilely. A display processor parses the visual data and maps or assigns a portion of the visual data to a display device as a function of the relative position of the display device.

In some variations of the invention, several display devices may cooperate to present visual data. Each display device presents a portion of the visual data, and the portion mapped to each display device depends upon that display device's relative position. In another variation of the invention, a single display device can present visual data by displaying a portion of the visual data at one time. The portion of the visual data mapped to the display device depends upon the position of the display device relative to a position reference, and as the position of the display device changes, the displayed visual data changes as well.

One implementation of the invention provides for one display device to include a processor that performs the functions of position reference, position processor and display processor. This "master" display device may track the position of other "subservient" display devices with respect to its own position. The "master" display device may further map visual data to itself and to the "subservient" display devices as a function of their respective positions.

In one embodiment, the invention is directed to a method that includes mapping a first portion of visual data to a first display device as a function of a position of the first display device relative to a position reference and mapping a second portion of the visual data to a second display device as a function of a position of the second display device relative to the position reference. The method may further include determining the respective positions, and mapping a different portion of the visual data to a device when its position changes.

In another embodiment, the invention is directed to a method comprising mapping a first portion of visual data to a display device as a function of a first position of the display device relative to a position reference, and mapping a second portion of the visual data to the display device as a function of a second position of the display device relative to the position reference. This embodiment may further support display of visual data on multiple display devices.

In further embodiments, the invention is directed to computer-readable media comprising instructions for causing a programmable processor to carry out any of the methods of the invention.

In an additional embodiment, the invention presents a system comprising a display device, a position processor configured to determine a position of the display device with respect to a position reference, and a display processor configured to map a portion of visual data to the display device as a function of the position.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
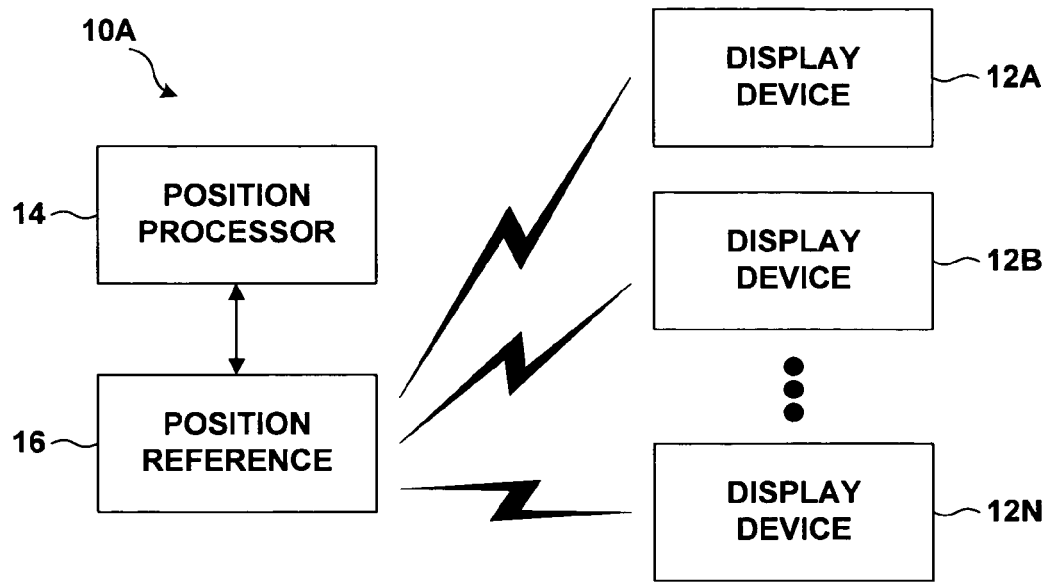
FIG. 1A is a block diagram illustrating determination by a position processor of positions of display devices relative to a position reference.
Figure 1B:
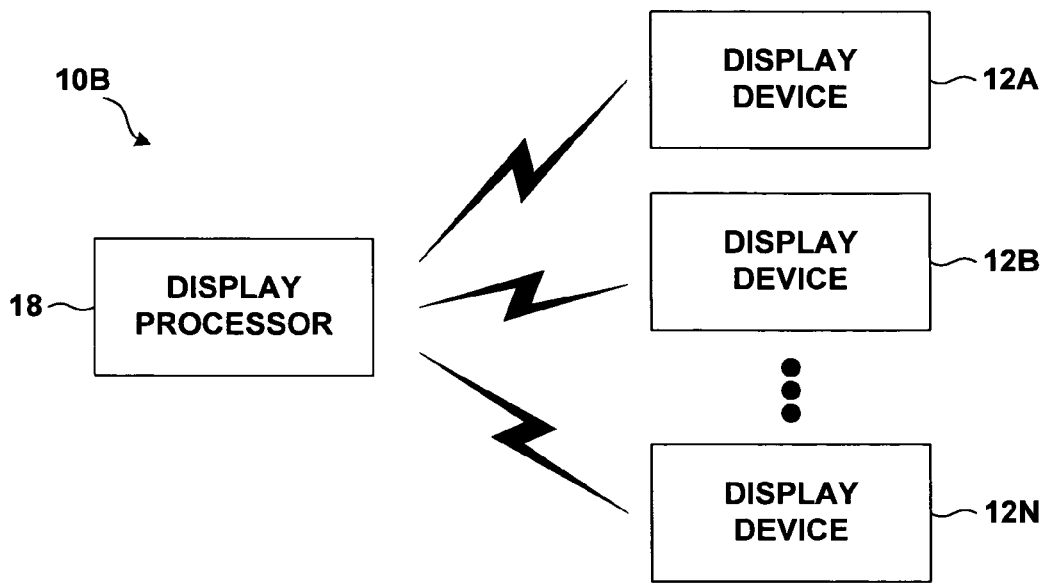
FIG. 1B is a block diagram illustrating mapping of visual data by a display processor to display devices.

FIGS. 1A and 1B are conceptual diagrams illustrating embodiments of the invention. Systems 10A and 10B demonstrate positional and content-based aspects of the invention. In a typical embodiment, the positional and content-based aspects may be combined in a single system, but FIGS. 1A and 1B shows the systems as separate for purposes of explanation and clarity.

Systems 10A and 10B each include a set of two or more display devices 12A to 12N (hereafter 12). Display devices 12 may comprise any devices configured to display visual information, such as display screens of personal digital assistants (PDAs), display screens of personal computers, display screens of tablet computers, stand-alone displays, monitors and televisions. Display devices 12 cooperate to present visual data to one or more users, and present the visual data according to the positions of display devices 12 relative to one another.

Visual data may include any information displayable on a display device. Visual data includes, but is not limited to, text, drawings, photographs, three-dimensional computer models, moving pictures, charts, tracings, animation and maps.

FIG. 1A illustrates a technique by which the relative positional orientations of display devices 12 may be determined. In system 10A, a position processor 14 determines the position of each display device 12 in the set with respect to a position reference 16. Position processor 14 comprises any processor that computes the relative position of each display device 12. In one embodiment of the invention, position processor 14 may be the processor of a personal computer, and one of display devices 12 may be the display of the same computer. In other words, position processor 14 may be housed in the same unit as one of display devices 12 in the set. In another embodiment of the invention, position processor 14 is distinct from display devices 12.

The relative position of display devices 12 may be a function several factors. The relative position of display devices 12 may be a function of the distance of one display device from another. The relative position may also be a function of the relative orientation of display devices 12, such as whether one display device is rotated with respect to another, or whether one display device is tilted in a different plane than another, or whether one display device overlaps another.

Position reference 16 may be any item that can serve as a positional reference, and may mathematically represent one or more fixed points in space. In the exemplary embodiment shown in FIG. 1A, position reference 16 is an active device that receives wireless communication from display devices 12. In this embodiment, position reference 16 may employ any of several wireless techniques to determine the distance and orientation of each display devices 12.

Position reference may include one or more active position sensors that sense the positions of display devices tactilely, electronically, optically, acoustically or electromechanically. Position reference 16 may, for example, generate an acoustic signal and determine the position of a display device as a function of a phase shift of a reflected signal. In another example, position reference 16 may track the position of multiple transponders on a display device 12 as a function of received electronic signal strength and/or signal timing from the transponders. The position of the transponders corresponds to the distance of display device 12 to position reference 16 and the orientation of display device 12 relative to position reference 16. When the locations of the transponders on an individual display device 12 are known, position processor 14 can compute the position of the display device using known mathematical principles such as triangulation and vector mathematics.

In other embodiments, display devices 12 include passive elements, such as retroreflective markers, that are optically detected by position reference 16. In further embodiments, position reference 16 may be passive and detectable by display devices 12. In these latter embodiments, each display device 12 determine its own distance and orientation relative to position reference 16, and transmits its position relative wirelessly to position reference 16 or to position processor 14. Display devices 12 may further communicate wirelessly with one another.

Wireless communication may be by any wireless technique, such as infrared and radio frequency communication techniques. In some circumstances, a cellular phone network may supply wireless communication channels. One exemplary communication protocol, commonly referred to as Bluetooth, uses short-range 2.4 GHz radio technology employed to transport data between devices. Other possible communication protocols include IEEE 802.11a, 802.11b, and 802.11g, which are industry standard protocols for wireless networking.

In addition, the invention is not limited to wireless communication. Display devices 12, position processor 14 and/or position reference 16 may also be physically linked to one another via USB cable, coaxial cable, phone cord, and the like.

In another embodiment, position reference 16 comprises a frame or platform that holds display devices 12, and can determine the position and orientation of display devices 12 by sensing contact between the devices and the frame or platform.

The invention is not limited to any of the above specific embodiments. Rather, the invention encompasses any number of techniques for detecting relative positions of display devices 12 and computing the relative position of each display device 12. Furthermore, computation of relative position of each display device 12 may be dynamic, with the relative position of each display device 12 detected and updated. In one embodiment, position processor 14 updates the relative position of each display device 12 in the set several times every second.

FIG. 1B illustrates a technique by which the relative positional orientations of display devices 12 are used to map visual data that is displayed by the display devices 12. In FIG. 1B, system 10B includes a display processor 18 that manages the display of the visual data. In particular, display processor 18 determines what portion of the whole of the visual data will be displayed on each display device 12, and how that portion will be displayed. In general, the portion of the visual data displayed on a display device 12 and the manner of display are a function of the relative positions of display devices 12 relative to one another. In other words, display processor 18 uses the positional computations from position processor 14 to determine how to map the visual data to display devices 12.

As shown in FIG. 1B, display processor 18 supplies the visual data to display devices 12 wirelessly. The invention is not limited to wireless transmission of visual data, however.

Position processor 14 and display processor 18 may be, but need not be, separate processors. In one embodiment of the invention, the operations of position processor 14 and display processor 18 may both be carried out by a single programmable processor of a personal computer. One of display devices 12 may be the display of the same computer.

In other words, the invention includes embodiments in which a plurality of display devices 12 are under the control of a single programmable processor. The single programmable processor may be included in a personal computer that controls not only its own display, but the displays of other devices as well.

Figure 2:
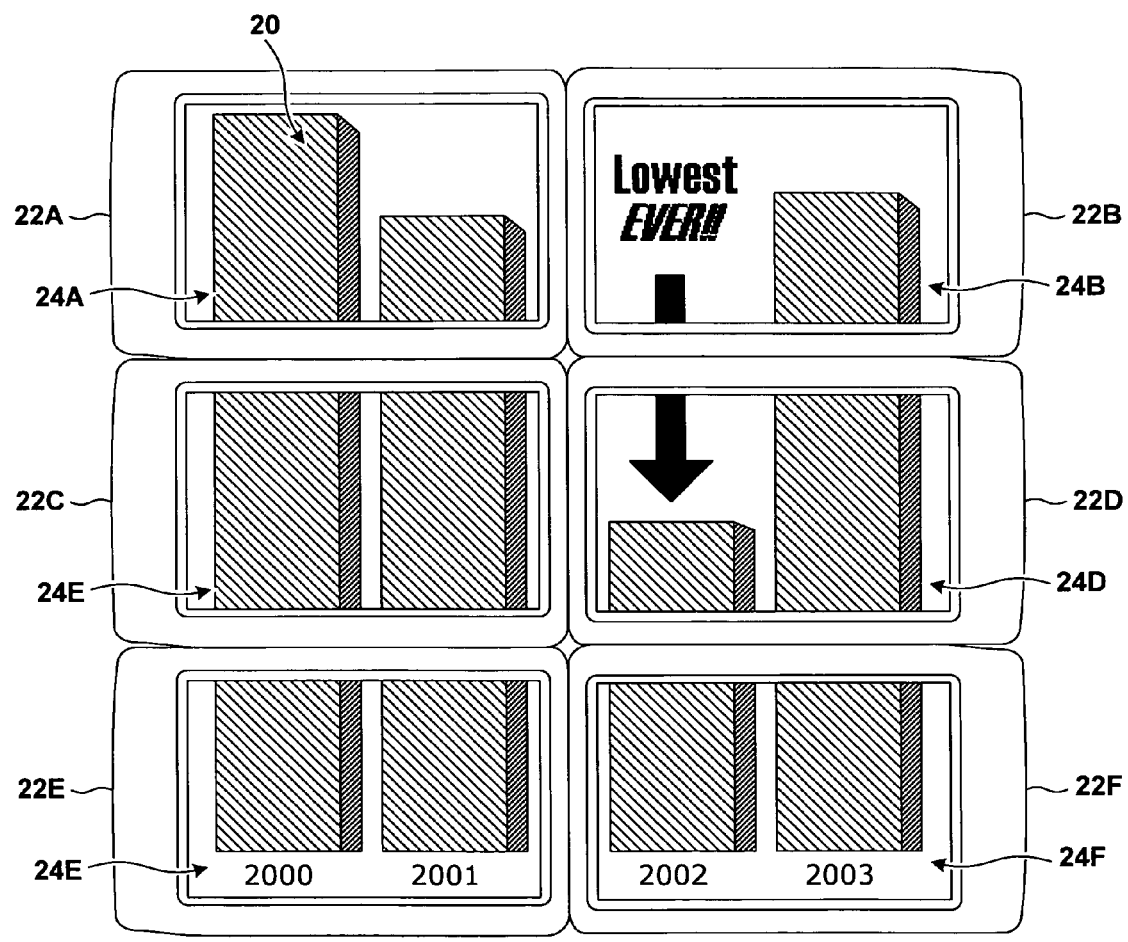
FIG. 2 is a plan view of a set of display devices that cooperate to present visual data.

FIG. 2 is a plan view of a display of visual data 20 according to an embodiment of the invention. In FIG. 2, the visual data 20 includes a chart and is displayed on the displays of six PDAs 22A-22F (hereafter 22). PDAs 22 may be deployed on a flat surface, for example, or in a frame to hold PDAs 22 in place. Each PDA includes a display 24A-24F (hereafter 24) and each display presents a portion of visual data 20.

Any of the PDAs 22 could house the position processor, position reference and display processor. For purposes of illustration, it will be assumed that PDA 22A is the "master," and includes the position processor, position reference and display processor. PDA 22A tracks the position of the other "subservient" PDAs 22B-22F relative to itself, and maps visual data 20 to itself and to "subservient" PDAs 22B-22F as a function of their positions.

In a variation of this implementation, a position reference (not shown) may monitor the positions of PDAs 22 and may supply the positional data to a "master" device for processing. PDA 22A, for example, may act as the "master" by determining the position of the other "subservient" PDAs 22B-22F relative to itself. PDA 22A may also act as the "master" by parsing the visual data into portions and mapping portions of the visual data to "subservient" PDAs 22B-22F as a function of their positions.

In FIG. 2, a single PDA, such as PDA 22A, may serve as the display processor, mapping visual data 20 to itself and to other PDAs 22B-22F as a function of position. Display screens 24, each presenting a part of visual data 20, hereby cooperate to display a larger version and more easily viewed version of visual data 20.

Figure 3:
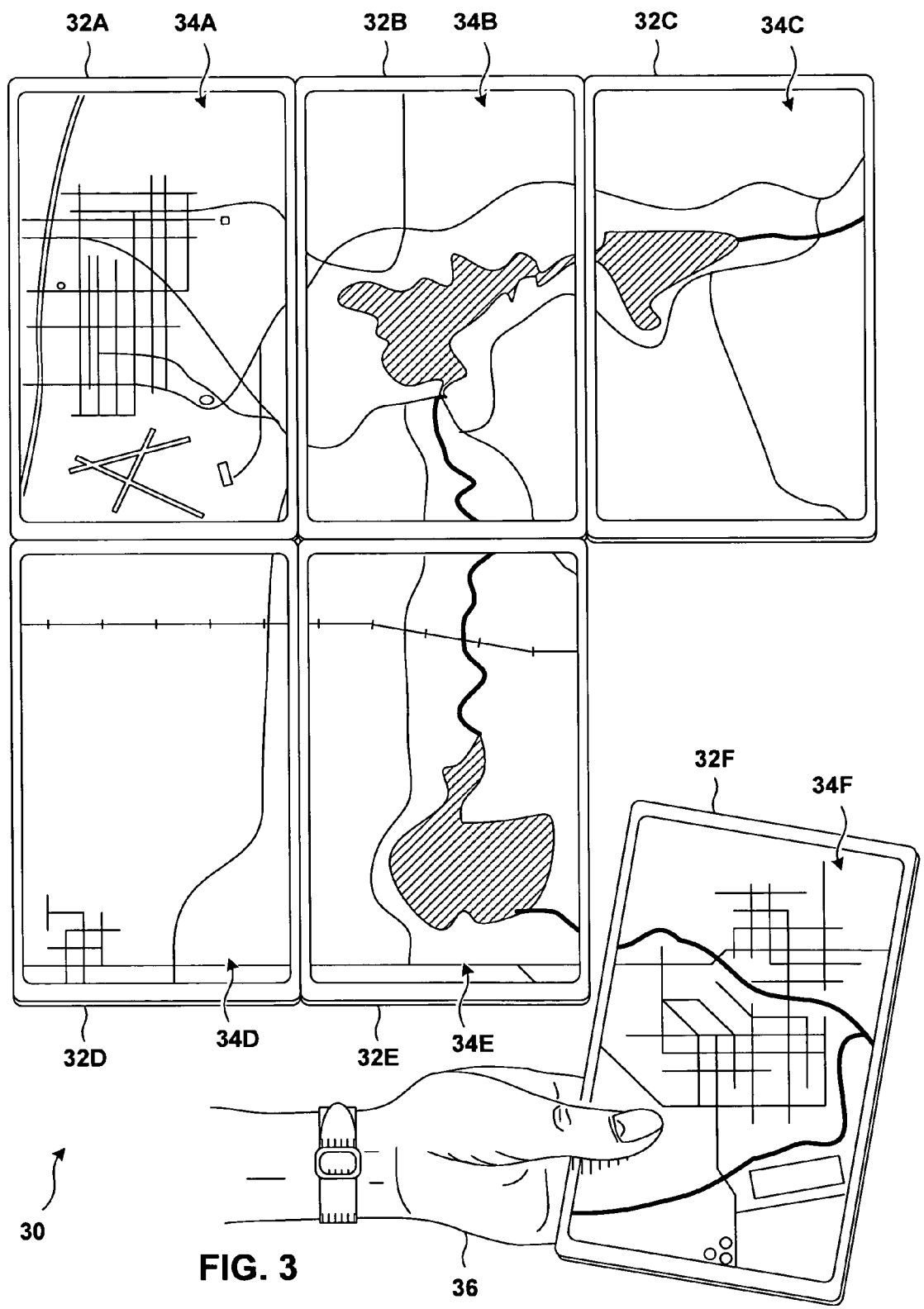
FIG. 3 is a plan view of another set of display devices that cooperate to present visual data.

FIG. 3 is another example that illustrates embodiments of the invention. In FIG. 3, visual data comprises a geographical map. Display devices 32A-32F (hereafter 32) comprise tablet computers, each with a large display 34A-34F. Display devices 32A-32F may be arrayed on a flat surface such as a table. A position processor (not shown) determines the position of each display device 32 with respect to a position reference (not shown). A display processor (not shown) maps visual data 30 to each display device 32 as a function of position. One or more display devices 32 may house the position processor, position reference and display processor, or position processor, position reference and display processor may be distinct from display devices 32.

The illustration in FIG. 3 may be useful when a group of individuals, each individual having a display device 32, desire to study a geographical map. The geographical map is encoded as visual data and may be stored in one or more of display devices 32. By arranging display devices 32 side-by-side, a larger, easier to view version of the geographical map can be displayed. Each display device 32 presents a portion of the geographical map, and the display devices 32 cooperate so that the individually displayed portions cooperate to generate a larger presentation.

In one embodiment of the invention, the invention supports dynamic updates of display device positions and visual data mapped to each device. As shown in FIG. 3, display devices 32A-32E are arranged substantially in a grid. This arrangement shows cities, towns, airports, roads, rivers, lakes, and the like. A user 36, however, has moved display device 32F to get a better view of a particular community. The position processor detects the change in position of display device 32F, and the display processor adjusts the visual data mapped to the display 34F of device 32F. As illustrated in FIG. 3, the mapping of visual data to display 34F may be true even if display device 32F is crooked with respect to other display devices 32A-32E.

To user 36, the effect is that of a virtual geographical map. By moving device 32F, user 36 can view any portion of visual data 30, like looking through a window at any desired region of the geographical map. Not all of visual data 30 need be presented at once. The dynamic updating of display device positions and visual data mapping allow visual data that is not visible in one arrangement of display devices 32 to become visible in another arrangement.

Figure 4:
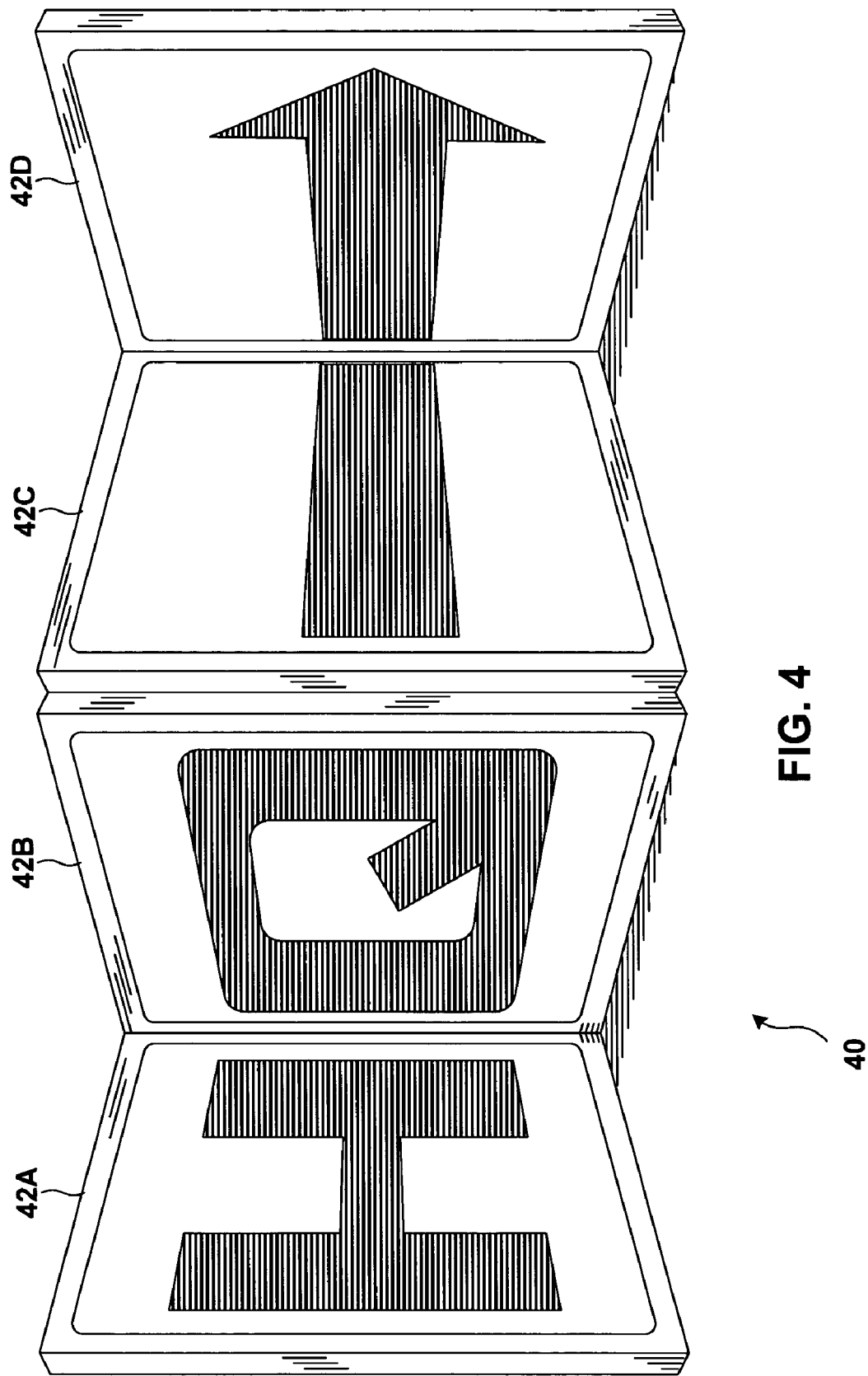
FIG. 4 is a plan view of another set of display devices that cooperate to present visual data.

FIG. 4 illustrates further embodiments of the invention. In FIG. 4, visual data 40 includes graphics elements for an informational presentation. Four flat panel displays 42A-42D (hereafter 42) are arranged in an accordion fashion. A position processor (not shown) determines the position of each display device 42 with respect to a position reference (not shown), and a display processor (not shown) maps visual data 40 to each display device 42 as a function of position. Notably, display devices 42 need not be arrayed in a planar fashion.

FIG. 4 further illustrates that visual data 40 and a whole may be of any size and shape. The invention adapts to present visual data that may not be easily displayed on a single conventional display device.

Display devices may be arrayed other than in an accordion fashion as shown in FIG. 4. Display devices may, for example, be arranged in a box configuration, with each side of the "box" displaying a different view of an object. A user may see the front of the object in one display screen, for example, a side view in another, a rear view in another, and so on.

Figure 5:
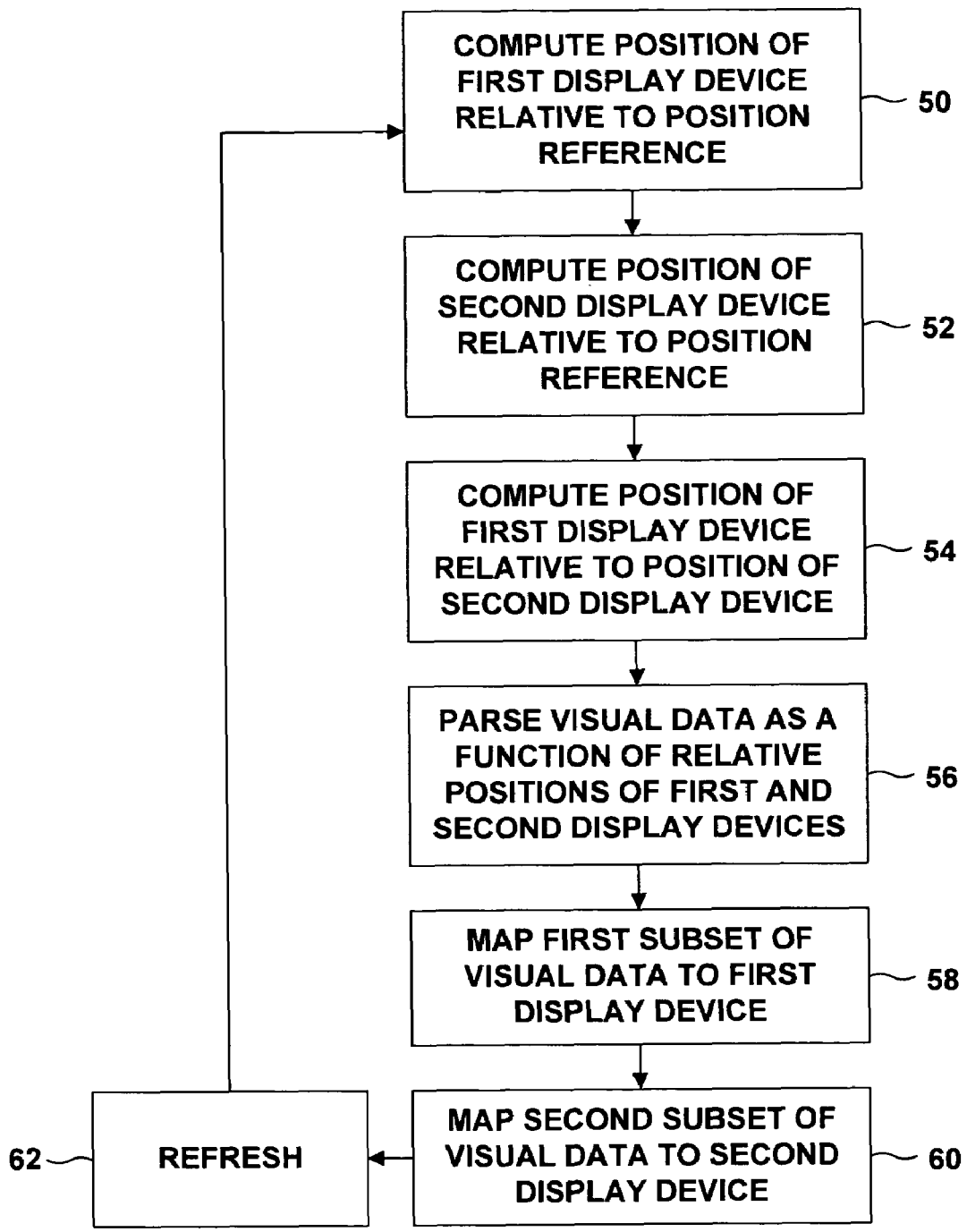
FIG. 5 is a flow diagram illustrating operations of a position processor and a display processor.

FIG. 5 is a flow diagram illustrating application of techniques according to an embodiment of the invention. In FIG. 5, it is assumed that a single processor carries out the functions of position processor and display processor, but the invention supports embodiments in which the functions are carried out by separate processors. Generally speaking, stages 50-54 may be carried out by the position processor, and stages 56-60 may be carried out by the display processor. Furthermore, it is assumed in FIG. 5 that there are two display devices, but the techniques of FIG. 5 can be adapted to any number of display devices.

In the embodiment of FIG. 5, the processor computes a position of the first and second display devices with respect to a position reference (50, 52) and may further compute the relative position of the first and second display devices with respect to one another (54). As noted above, the position of each display device may be sensed in any number of ways, and the relative positions of the display devices may be computed by triangulation or vector mathematics.

The processor parses the visual data into subsets as a function of the relative position of the first and second display devices (56). In other words, each display device receives a portion of the visual data, and the portion depends upon the relative positions of the display devices. The processor maps the respective subsets of visual data to the respective devices (58, 60), which display the respective portions of the visual data. The processor may further periodically refresh the display of visual data (62) by reevaluating the positions of the display devices and mapping the visual data accordingly.

Figure 6:
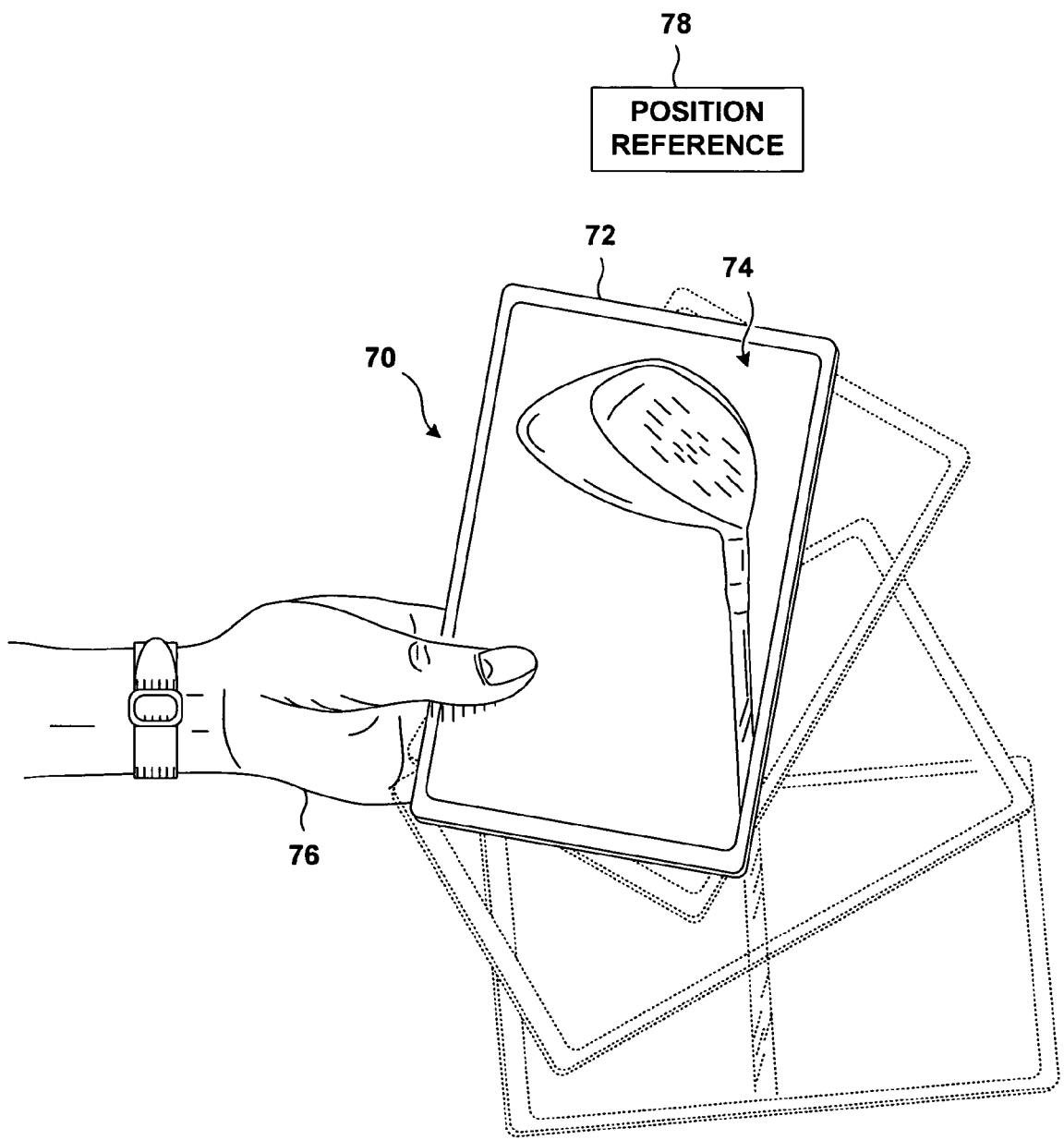
FIG. 6 is a plan view of a single display device that presents different portions of visual data.

FIG. 6 demonstrates a further embodiment of the invention. The visual data 70 in FIG. 6 is a representation of a consumer product. In the embodiment shown in FIG. 6, a single display device 72, such as a tablet computer, displays a portion of visual data 70 on a display screen 74. As user 76 moves display device 72 relative to a position reference 78, the portion of displayed visual data 70 changes, allowing user 76 a chance to see other features of the consumer product.

In this way, a display processor (not shown) maps a first portion of visual data to display device 72 as a function of a first position of display device 72, relative to position reference 78. When the position of display device 72 changes, the display processor maps another portion of the visual data to display device 72 as a function of the updated position, relative to position reference 78.

Furthermore, the invention supports embodiments in which the perspective of an object, such as a three-dimensional computer model of a consumer product, changes. When in one position, the display device 72 presents a view of the object from a first perspective, and in a second position, the display device 72 presents a view of the object from a second perspective. In other words, by changing the position of display device 72 with respect to position reference 78, user 76 can see along the length of the object, and also the front, back and sides of the object as well. By moving display device 72 "around" the object, the user may view rotated views of the object.

In this embodiment, display device 72 may house a processor that performs the function of position processor and display processor. The processor maps visual data, which may be stored in memory in display device 72, to display 74 as a function of the position of display device 72 relative to position reference 78.

As illustrated in FIG. 6, the invention may create a "virtual object," i.e., the invention may create an appearance of a three-dimensional object, even though no physical three-dimensional object is present. The invention may further support a "virtual X-ray," which creates the appearance of being able to see through a solid physical object. By moving a display device along or around a physical object, a user can see a virtual representation of what lies beneath the surface of the physical object. A virtual X-ray may allow a user to recall the location of wiring or pipes behind a wall, for example, by moving a display device proximate to the wall. The visual data—the location of the wiring and the pipes in this example—may have been recorded when the wall was built.

The invention may offer one or more advantages. The invention supports a range of flexibility for displaying visual data. The invention can be adapted to any number of display devices, and many different kinds of display devices.

The invention is portable. In some circumstances, it is more advantageous to transport several small display devices rather than one large display device. In addition, there may be circumstances in a group of individuals, each having a display device, can use their display devices cooperatively to achieve benefits not available to each display device individually.

Several embodiments of the invention have been described. Various modifications may be made without departing from the scope of the invention. For example, the invention may support multiple position processors or display processors. The invention may further support any position sensors that sense position tactilely, electronically, optically, electromechanically, or by any other technique or combination of techniques.

Although described in terms of display devices that are handheld, the invention is not limited to display devices of any size. Nor is the invention limited to planar display devices. Furthermore, the invention accommodates implementations in which a set of display devices includes display devices differing kinds or sizes. Nor is the invention exclusively limited to display of visual data. One or more display devices may generate audio output, for example, in addition to presenting visual data.

Furthermore, the invention is not limited to embodiments in which determining the position of a display device is performed automatically. The invention includes some embodiments in which the position of the display device is supplied to the display processor manually.

In addition, the invention includes some embodiments comprising any of a variety computer-readable media comprising instructions for causing a programmable processor to carry out the techniques described herein. Such computer-readable media include, but are not limited to, magnetic and optical storage media, and read-only memory such as erasable programmable read-only memory or flash memory. These and other embodiments are within the scope of the following claims.

The invention claimed is:

1. A system comprising:
   a first display device;
   a second display device; and
   a processor that determines positions of the first and second display devices relative to a position reference and maps respective portions of visual data to the first and second display devices as a function of the determined positions of the first and second display devices, wherein movement of one of the display devices relative to the other display device causes at least one of the display devices to display a different portion of the visual data, wherein the first and second display devices wirelessly communicate with one another, and wherein the first display device is a master device that includes the processor and the second display device is a slave device that receives its respective portion of the visual data from the first display device as a function of the determined position of the second display device relative to the position reference.

2. The system of claim 1, wherein movement of the second display device relative to the first display device causes a change in the respective portion of the visual data displayed by the second display device.

3. The system of claim 1, wherein the visual data comprises a geographical map and wherein first and second display devices display respective portions of the geographical map.

4. The system of claim 1, wherein the visual data comprises three-dimensional data, and wherein the movement of one of the display devices relative to the other display device comprises three-dimensional movement that causes at least one of the display devices to display a different portion of the three-dimensional data.

5. The system of claim 1, further comprising additional display devices that display different portions of the visual data as a function of positions of the additional display devices relative to the position reference.

6. The system of claim 1, wherein the position reference comprises at least one of an electronic sensor, an optical sensor, an electromechanical sensor, an acoustic sensor and a tactile sensor.

7. A method comprising
   determining positions of first and second display devices relative to a position reference; and
   mapping respective portions of visual data to the first and second display devices as a function of the determined positions of the first and second display devices, wherein movement of one of the display devices relative to the other display device causes at least one of the display devices to display a different portion of the visual data, wherein the first and second display devices wirelessly communicate with one another, and wherein the first display device is a master device having a processor that determines the position of the first and second display devices relative to the position reference, and the second display device is a slave device that receives its respective portion of the visual data from the first display device as a function of the determined position of the second display device relative to the position reference.

8. The method of claim 7, wherein movement of the second display device relative to the first display device causes a change in the respective portion of the visual data displayed by the second display device.

9. The method of claim 7, wherein the visual data comprises a geographical map and wherein first and second display devices display respective portions of the geographical map.

10. The method of claim 7, wherein the visual data comprises three-dimensional data, and wherein the movement of one of the display devices relative to the other display device comprises three-dimensional movement that causes at least one of the display devices to display a different portion of the three-dimensional data.

11. The method of claim 7, further comprising determining positions of additional display devices relative to the position reference and displaying different portions of the visual data on the additional display devices as a function of the positions of the additional display devices relative to the position reference.

12. The method of claim 7, wherein the position reference comprises at least one of an electronic sensor, an optical sensor, an electromechanical sensor, an acoustic sensor and a tactile sensor.

* * * * *